United States Patent
Kam et al.

(10) Patent No.: US 11,814,524 B2
(45) Date of Patent: Nov. 14, 2023

(54) WOOD PASTE AND OBJECTS MADE THEREFROM

(71) Applicant: YISSUM RESEARCH DEVELOPMENT COMPANY OF THE HEBREW UNIVERSITY OF JERUSALEM LTD, Jerusalem (IL)

(72) Inventors: Doron Kam, Ramat Raziel (IL); Michael Layani, Jerusalem (IL); Oded Shoseyov, Shoham (IL); Shlomo Magdassi, Jerusalem (IL)

(73) Assignee: Yissum Research Development Company of the Hebrew University of Jerusalem Ltd.

( * ) Notice: Subject to any disclaimer, the term of this patent is extended or adjusted under 35 U.S.C. 154(b) by 0 days.

(21) Appl. No.: 16/959,856

(22) PCT Filed: Jan. 7, 2019

(86) PCT No.: PCT/IL2019/050033
§ 371 (c)(1),
(2) Date: Jul. 2, 2020

(87) PCT Pub. No.: WO2019/135245
PCT Pub. Date: Jul. 11, 2019

(65) Prior Publication Data
US 2020/0369888 A1    Nov. 26, 2020

Related U.S. Application Data

(60) Provisional application No. 62/614,438, filed on Jan. 7, 2018, provisional application No. 62/614,437, filed on Jan. 7, 2018.

(51) Int. Cl.
| | | |
|---|---|---|
| *C08L 97/02* | (2006.01) | |
| *C08K 13/04* | (2006.01) | |
| *C08L 1/02* | (2006.01) | |
| *C08L 3/02* | (2006.01) | |
| *C08L 5/14* | (2006.01) | |
| *C08L 97/00* | (2006.01) | |
| *C09D 197/02* | (2006.01) | |
| *B33Y 70/00* | (2020.01) | |
| *B33Y 80/00* | (2015.01) | |

(52) U.S. Cl.
CPC .............. *C08L 97/02* (2013.01); *C08K 13/04* (2013.01); *C08L 1/02* (2013.01); *C08L 3/02* (2013.01); *C08L 5/14* (2013.01); *C08L 97/005* (2013.01); *C09D 197/02* (2013.01); *B33Y 70/00* (2014.12); *B33Y 80/00* (2014.12); *C08K 2201/011* (2013.01); *C08L 2203/16* (2013.01)

(58) Field of Classification Search
CPC .................................. C08L 97/02; C08L 1/02
See application file for complete search history.

(56) References Cited

U.S. PATENT DOCUMENTS

| | | | | |
|---|---|---|---|---|
| 4,183,997 A | * | 1/1980 | Stofko | B27D 1/04 |
| | | | | 428/326 |
| 4,941,948 A | * | 7/1990 | Yamamoto | B27N 3/002 |
| | | | | 162/142 |
| 2005/0142973 A1 | * | 6/2005 | Bletsos | D21H 27/38 |
| | | | | 442/340 |
| 2015/0017432 A1 | * | 1/2015 | Shoseyov | G02B 1/10 |
| | | | | 428/336 |
| 2015/0033983 A1 | * | 2/2015 | Bilodeau | B27N 3/04 |
| | | | | 106/162.5 |
| 2015/0368368 A1 | * | 12/2015 | Retsina | C09D 101/04 |
| | | | | 106/203.2 |
| 2016/0002462 A1 | | 1/2016 | Zhang et al. | |
| 2016/0168272 A1 | * | 6/2016 | Retsina | C08B 15/08 |
| | | | | 162/9 |
| 2016/0168363 A1 | * | 6/2016 | Nelson | C08L 1/04 |
| | | | | 428/35.7 |
| 2016/0257814 A1 | * | 9/2016 | Schade | C08L 1/02 |
| 2016/0355710 A1 | | 12/2016 | Feng et al. | |
| 2017/0027168 A1 | * | 2/2017 | Heath | A61P 17/00 |
| 2017/0088705 A1 | * | 3/2017 | Lapidot | C09D 7/70 |
| 2017/0368225 A1 | * | 12/2017 | Gatenholm | A61L 27/20 |
| 2018/0258188 A1 | * | 9/2018 | Slattegard | C08B 3/02 |
| 2018/0298113 A1 | * | 10/2018 | Nelson | C12P 19/14 |
| 2019/0223680 A1 | * | 7/2019 | Yamazaki | D21H 17/63 |
| 2019/0234020 A1 | * | 8/2019 | Backfolk | D21H 27/38 |
| 2019/0248987 A1 | * | 8/2019 | Moolman | C04B 24/383 |
| 2019/0330483 A1 | * | 10/2019 | Kojima | C09D 11/14 |
| 2020/0023409 A1 | * | 1/2020 | Axrup | D21H 25/14 |
| 2020/0056334 A1 | * | 2/2020 | Heiskanen | D21H 27/10 |

FOREIGN PATENT DOCUMENTS

| | | |
|---|---|---|
| CN | 105400166 | 3/2016 |
| CN | 105906940 | 8/2016 |
| WO | 2009086141 | 7/2009 |

OTHER PUBLICATIONS

Van Niekerk et al. (Holz als Roh und Werkstof 52, 1994, 109-112) (Year: 1994).*

(Continued)

*Primary Examiner* — Liam J Heincer
(74) *Attorney, Agent, or Firm* — McAndrews, Held & Malloy, Ltd.

(57) ABSTRACT

The invention generally concerns methods and printing inks comprising wood chips/wood powder and plant-extracted natural binders for constructing wood 3D structures.

14 Claims, 10 Drawing Sheets

(56) References Cited

OTHER PUBLICATIONS

Tan et al. (Developing Composite Wood for 3D-Printing, Protocols, Flows and Glitches, Proceedings of the 22nd International Conference of the Association for Computer-Aided Architectural Design Research in Asia (CAADRIA) 2017, 831-841) (Year: 2017).*
Kajsa Markstedt et al., ACS Applied Materials & Interfaces, vol. 9, No. 46, Jul. 11, 2017, XP055572879, pp. 40878-40886.

* cited by examiner

WOOD PASTE AND OBJECTS MADE THEREFROM

CROSS-REFERENCE TO RELATED APPLICATIONS

The present application is a National Phase Entry of PCT International Application No. PCT/IL2019/050033 which was filed on Jan. 7, 2019, which claims priority to provisional patent application Ser. No. 62/614,438, filed Jan. 7, 2018, and Ser. No. 62/614,437, filed Jan. 7, 2018, all of which are hereby incorporated by reference in their entireties.

TECHNOLOGICAL FIELD

The invention generally relates to wood objects and processes for their production.

BACKGROUND

Wood composite resins are a key factor towards digital deposition and fabrication of wood objects. Among the currently known resins, urea formaldehyde (UF) and phenol formaldehyde (PF) are the most widely used. Formaldehyde in wood composites is heavily legislated for limiting formaldehyde to less than 0.05 ppm (RAL-UZ 38). An alternative synthetic resins aimed at avoiding the use of formaldehyde is methylene diphenyl diisocyanate (MDI). MDI is an allergen and sensitizer of isocyanates. Although it has a low vapor pressure, MDI is considered as a violently reactive material towards water and other nucleophiles and therefore not industrially appealing.

Thus, the need exists for objects, such as furniture and wood tiles, which are free from these and other hazardous chemicals.

Cellulose nanocrystals are rod-like, nanometric-sized, crystalline components, made from cellulose, a major polysaccharide building block in the plant cell wall. Hemicelluloses are another major family of polysaccharides entangled in the cellulose microfibrils. These materials were used in various applications in the conventional wood resin industry as a low concentration additive substitute to the UF/PF and other resins.

WO 2009/086141 [1] describes reinforcing adhesive with different types of cellulose microfibers with nano/micro clays. The adhesive contains 0-10 wt. % of cellulose/clays whereas the rest of the adhesive (90-100 wt. %) is selected amongst industrial chemical resins such as formaldehyde based resin, pMDI, etc.

US Patent Application no. 2016/0002462 [2] discloses the use of CNC as an additive to phenolic thermoset resins. Formaldehyde materials are proposed for reinforcement of CNC, which composes up to 2 wt. % of the thermoset resin.

US Patent Application no. 2016/0355710 [3] discloses nanocrystalline cellulose derived formaldehyde-based adhesives. The formaldehyde-based adhesives are invented with the use of CNC as a replacement for wood flour or in addition to the resin mixture. CNC is added in an amount less than 1% w/w, being less than 5% w/w of the added wood flour or equivalent based on the total amount of the resin. That is, more than 90% of the resin is formaldehyde-based.

Chinese Patent Application no. 105906940 [4] discloses marble or wood 3D printing objects composed of plastics and printed by a fused deposition modeling (FDM) 3D printer. The filament consists of a polymer (30-90 wt. %) with different additives to give a wood-like "feeling", yet no real wood is used in the filament.

REFERENCES

[1] WO 2009086141
[2] US Patent Application no. 20160002462
[3] US Patent Application no. 20160355710
[4] Chinese Patent Application no. 105906940

GENERAL DESCRIPTION

With the above background in mind, one would realize that all 3D wood structure are in fact "wood-like" in composition and presentation. The known wood-like products of the art are composed of synthetic polymers, with the vast majority of wood resins containing hazardous and harmful chemicals. Therefore, there exists a need for materials and processing technologies for fabrication of 3D objects that are fully composed of wood, that are biodegradable and free from hazardous and harmful chemicals. Yet, despite the increasing demand in the industry for real biodegradable materials and for natural materials for additive manufacturing, to date, manufacture, e.g., by printing, of 3D objects comprising 100% wood or wood materials, has never been achieved.

The inventors of the technology disclosed herein have developed, for the first time, manufacturing methodologies, methods and printing inks which make use of wood chips/powder and plant-extracted natural binders. Composition of the invention permit freedom of design for 3D structures solely containing natural components; these structures being achievable by, for example, printing methodologies.

As disclosed and exemplified, 3D objects according to the invention are wood objects fabricated by using a composition (combination) of wood powder and a binder composed of cellulose nanocrystals (CNCs) and hemicellulose, absent (or free) of any additional resins, formaldehyde and other hazardous and harmful materials (such as urea formaldehyde (UF), phenol formaldehyde (PF) and methylene diphenyl diisocyanate (MDI)).

Thus, in a first aspect, the invention provides a composition comprising at least one wood material, at least one cellulose nano-material and at least one hemicellulose and/or lignin and/or starch.

Compositions of the invention are pastes or plasticine-like, namely semisolids in nature which may be kneaded into any shape. The compositions may be used in any 'arts and crafts' method for the preparation of ornamental, toys or otherwise any functional object. The objects may be formed by adults and kids alike, employing any means known in the art for the manufacture/creation of such objects. Methods of manufacture may be selected from a variety of activities involving making things with one's own hands or with templates or casts. Methods of manufacture may also or alternatively involve or comprise casting, molding, extrusion, calendaring, injection, printing, hand-forming and manual processing (e.g., by a pottery wheel), and others.

In some embodiments, the composition is suitable for an additive manufacturing process.

The invention further provides a composition comprising at least one wood material, at least one cellulose nano-material and at least one hemicellulose and/or lignin and/or starch, for use in (a) a process of fabrication of 3D wood objects; or
(b) a process for coating or covering a surface region of a plastic or a polymeric material with the wood material;
wherein the composition is free of formaldehyde, synthetic resins and/or epoxy based materials, as disclosed herein.

Compositions of the invention are free of formaldehyde, urea formaldehyde (UF), phenol formaldehyde (PF), methylene diphenyl diisocyanate (MDI), synthetic resins and epoxy-based materials. In some embodiments, the compositions are free from formaldehyde and/or synthetic resins and/or epoxy-based materials. In some embodiments, compositions of the invention are free of formaldehyde, UF, PF and synthetic resins.

Compositions of the invention may be used or formed into ink compositions for forming a 2D pattern or a 3D object by printing, e.g., digital printing. In some embodiments, the objects are processed by casting into 3D structures without using a digital printer. In some embodiments, the objects are processed to a 3D structure using molds and not using a digital printer. In some embodiments, the objects are not in a form having a plastic or polymeric core encapsulated or surrounded or sandwiched or coated with a wood element provided by a composition of the invention.

The at least one wood material is a fully natural wood and comprises no unnatural or synthetic additives such as resins, stabilizers, etc. The wood material is presented in a composition of the invention in a form suitable for processing, e.g., printing. The wood material may thus be processed into a form selected from wood flour, wood chop, micro-crystalline cellulose (MC), wood chips, wood chips, nano fibrilated cellulose (NFC), cellulose nano crystals (CNC), lignin and lignin derivatives, hemicellulose, xyloglucan, arabinoxylan, xylan, starch and pectin. The wood materials can be derived from natural sources (first use) or recycled wood.

In some embodiments, the wood material may be derived from wood stalks or branches, trunk or wood bark and processes into a form selected from wood flour, wood chop and wood chips.

The wood material may be obtained from the stalks or branches, trunk or bark of any tree or bush (any 'wood source'). The trees or bushes may be selected from basswood, beech, birch, *eucalyptus*, walnut, pecan, cedar, cherry, elm, gum, hickory, lauan, mahogany, maple, oak, pine, poplar, redwood, rosewood, satinwood, sycamore, teak, alder, apple, aspen, chestnut, cottonwood, cypress, fir, hackberry, hemlock, holly, koa, laurel, locust, *magnolia*, pearwood, spruce, tupelo and willow.

In some embodiments, the tree is *eucalyptus*.

In some embodiments, the wood source is selected from hard and soft wood.

In some embodiments, the wood source is selected based inter alia on the hardness of the wood, the dryness of the wood, the ability to process the wood into a particulate form, the intended properties in a final wood object, the processing temperature, and others.

In some embodiments, a composition according to the invention may comprise at least one wood material as a combination of two or more wood sources, as defined herein.

The at least one cellulose nano-material is a material selected from cellulose nanocrystals (CNC, also known as nanocrystalline cellulose, NCC), nanofibrillated cellulose (NFC), bacterial nanocellulose (BNC) and chemical derivatives thereof.

In some embodiments, the cellulose nano-material is CNC.

Cellulose nanocrystals are highly crystalline nanoparticles generated during controlled acid hydrolysis of cellulose fibers resulting in the degradation of amorphous regions. CNCs exhibit rod-like shape with 100-400 nm length and 5-20 nm width and are considered super strong materials. CNCs may be present as a chiral nematic liquid crystal solution in water or organic solvents and self-assemble to macroscale highly transparent ordered films with nanoscale thickness and a layered structure. The material can be produced from cell walls of trees, plants and waste effluents such as paper mills and municipal sewage sludge, and has recently become commercially available at the commercial scale. CNC may be prepared according to any one available procedure, for example according to procedures reported in WO 2012/014213, WO 2015/114630, and in US applications derived therefrom, each one being herein incorporated by reference.

The at least one hemicellulose is selected from xylan, glucuronoxylan, arabinoxylan, glucomannan, galactoglucomannan and xyloglucan. In some embodiments, the hemicellulose is xyloglucan.

In some embodiments, a composition of the invention comprises at least one wood material, CNC and a hemicellulose or starch or lignin.

Lignin is a constituent of cell walls of almost all dry land plants. It is the second most abundant natural polymer in the world, surpassed only by cellulose. Lignin is the only polymer found in plant cell walls that is not composed of carbohydrate (sugar) monomers but rather of three different phenyl propane monomers. Thus, lignin may be in various forms depending on its natural source. These and all lignin forms and derivatives are within the scope of the present invention.

In some embodiments, a composition of the invention comprises at least one wood material, CNC and lignin. In some embodiments, the composition further comprises xyloglucan.

In some embodiments, a composition of the invention comprises at least one wood material, CNC and xyloglucan.

In some embodiments, a composition according to the invention may further comprise at least one solvent or liquid carrier and/or at least one functional additive. The liquid carrier may be selected from water or aqueous solutions, Dowanol solvents with various boiling points and viscosities (such as propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, propylene glycol n-butyl ether, dipropylene glycol n-butyl ether, tripropylene glycol n-butyl ether, propylene glycol phenyl ether, dipropylene glycol phenyl ether, propylene glycol diacetate, bis-dipropylene glycol n-butyl ether adipate, ethylene glycol phenyl ether, diethylene glycol phenyl ether, poly(oxy-1,2-ethanediyl), alpha-phenyl-omega-hydroxy) or volatile solvents such as but not limited to ethanol, isopropanol and propylene glycol ethers, methyl ether ketone, ethyl acetate, ethanol, butyl\ethyl acetate or non-volatile liquids such as and not limited to linseed oil, castor oil and olive oil. The functional additive may be a natural surface tension modifier such as phospholipids and saponins, natural rheological agents such as polysaccharides and proteins, fire retardants and natural evaporation retardant materials such as sugars, glycerol and salts. The compositions may further comprise fungi, e.g., Mycelium.

In some embodiments, the liquid carrier is water. In other embodiments, the water carrier is not an organic solvent.

Based on the solvent or liquid carrier or the additives used, a composition of the invention may be in the form of a solid composition, a slurry, a paste, a pseudo-plastic liquid, a Newtonian liquid and others.

In compositions of the invention, the concentration of CNC is up to 20 wt % or at least 0.01 wt %. In some embodiments, the CNC concentration may be from 0.05% to 20 wt % based on the total weight of the composition.

The weight ratio of the at least one hemicellulose to CNC may be from 0:1 to 1:10.

In some embodiments, a composition comprises 50 wt % wood flour of the total composition, 30 wt % CNC and 10 wt % hemicellulose. In some embodiments, a composition comprises 90 wt % wood flour of the total composition, 5 wt % CNC and 5 wt % hemicellulose. In some embodiments, a composition comprises 50 wt % wood flour of the total composition, 20 wt % CNC, 5 wt % hemicellulose and 25% wt. Mycelia fungi.

Compositions of the invention may be prepared by admixing the at least one wood material, at least one cellulose nano-material and at least one hemicellulose and/or lignin and/or starch together under conditions permitting sufficient association between particles of the at least one wood material. Alternatively, the compositions may be prepared by first forming a composition comprising at least one cellulose nano-material and at least one hemicellulose and/or lignin and/or starch, and only thereafter mixing or applying or contacting or bringing into contact the composition with the at least one wood material.

In some embodiments, a dispersion of CNC in water is contacted with the at least one wood material, e.g., wood flour or chips, under conditions permitting adherence of the CNC to the surface of the wood flour or wood chips. After water evaporates, the CNC acts as a binder between the wood pieces. In some embodiments, the CNC is mixed with the wood flour or wood chips into a homogenous mixture.

The at least one hemicellulose, and/or starch, and/or lignin, may be introduced together with the CNC or after a homogeneous mixture of CNC and wood particles is formed.

As noted hereinabove, compositions of the invention may be used as ink compositions for printing, e.g., 3D printing. As the composition uses solid liquid-insoluble materials, such as wood chips, methods of producing a pattern or a 3D object by printing may be or involve extrusion based printing, e.g., 3D printing, direct write, and/or ink-jet based printing, e.g., 3D printing, binder jet processes. In some embodiments, the printing method may be selected from ink-jet printing methodologies, e.g., continuous inkjet printing (CIJ) or drop on demand (DoD) printing.

In some embodiments, when utilizing a DIW (dispenser), the composition may be in a form of a pseudo-plastic composition so that the printed material can hold until final drying. In this approach, the composition, as defined, may be fully or partially mixed with the wood flour and subsequent to printing and drying of the liquid carrier, e.g., water, the object may be immersed or coated or contacted with another natural binder solution for final hardening.

In some embodiments, when utilizing a binder jet printing, the composition, as defined, must have ink-jet ink properties (i.e., viscosity, surface tension, volatility) and may be printed on pre-treated or untreated wood flour. In binder jetting, the wood flour layer may be pressed in each printed layer to improve density and mechanical properties. It is also possible in this approach to use fibers in the ink to induce high mechanical properties.

In some embodiments, a composition is applied by printing, e.g., by ink-jet printing, onto at least one wood material.

In some embodiments, a composition is applied by direct ink writing.

In some embodiments, an object may be prepared by molding a composition of the invention.

Compositions of the invention may provide 2D patterns on a surface, which may be self-standing, or 3D structures or objects. Thus, the invention also provides objects or wood structures, composed solely of wood and plant components. Putting it differently, the objects may comprise or consist wood and natural materials, as defined herein. In some embodiments, the objects may comprise one or more features, elements, parts, regions or surfaces that are not made of wood and natural materials. These one or more features, elements, parts, regions or surfaces may be of a material selected from a polymeric material, a ceramic material, a metallic material and others and which are achieved by post treatment of the fully wood object. Such structural or material modifications enable manufacture of e.g., functional objects.

In some embodiments, the objects are not in a form having a plastic or polymeric core encapsulated or surrounded or sandwiched or coated with a wood element provided by a composition of the invention.

The invention further provides a green additive manufacturing process for the production of biodegradable wood objects. This technology may be a standalone manufacturing process or may be integrated in existing processes in the wood industry. The fully natural compositions of the invention can also be used as materials to replace conventional wood-like objects while using only natural materials composed of wood and plant components. With the growing demand for green materials, this invention eliminates the chemical safety issues, which are currently encountered with current industries such as building, constructions and furniture.

A 3D composite multi-material object can be easily designed and embedded inside or outside other conventional 3D printing materials, ranging from nano particles, inorganic, organic, and other polymers.

Thus, compositions and processes of the invention may be combinable with manufacturing processes, e.g., digital printing processes, of floor tiles, industrial design, building facades, and others.

The invention further provides a composition comprising at least one wood material, at least one cellulose nano-material and at least one hemicellulose and/or lignin and/or starch, for use in a process of encapsulating or coating or covering a surface region of a plastic or a polymeric material or an object of any non-natural material.

In some embodiments, the composition is a paste composition, as disclosed herein, that is mechanically or manually manipulated to encapsulate, coat or cover a surface region of a plastic or a polymeric material or an object of any non-natural material.

In some embodiments, the composition is an ink composition. In some embodiments, the ink composition is for the construction of 2D or 3D patterns or objects. In some embodiments, the objects are not in a form having a plastic or polymeric core encapsulated or surrounded or sandwiched or coated with a wood element provided by a composition of the invention.

Compositions of the invention may be used as ink compositions for printing on or coating a surface region of a polymeric structure or object or an object made of any material. The object, e.g., a polymeric object, may be of any shape and size and need not be covered or encapsulated or coated completely. In some embodiments, the object is formed by applying, e.g., by printing, at least one film or coat or layer of a wood-based composition according to the invention on at least a surface region of the object. Alternatively, an object according to the invention may be formed by using multi-material printers or digital dispensers. In such multi-material printers, two or more heads (or up to 10 heads) may be used in which each head can be based on a different dispensing method, such as: 1-DM/heated nozzles, UV curable nozzle/cooled nozzle, laser, CNC etc.

The core or element or feature on the surface of which a wood-based composition according to the invention is to be applied may be fabricated in both injection molding or additive manufacturing methods. Thus, a combination of one or more extrusion heads printing whole wood parts with FDM head (at least one but not limited) printing thermoplastic or thermoset polymers. In such cases, one head will print the object material and the other head can print the wood-based natural ink. The formed object can be completely wood coated or composed of partially wood part.

The material from which the object or feature is formed may be selected amongst thermoplastic polymers and to thermoset polymers.

In some embodiments, where the object is made of a polymeric material, the material may be selected from thermoset polymers, such as thermoset silicone polymers e.g., cured silicone elastomers, silicone gels, and silicone resins; and thermoset organic polymers, such as furan resins, epoxy resin amino resins, polyurethanes (polyols and isothiocyanates), polyimides, phenolic resins, cyanate ester resins, bismaleimide resins, polyesters, acrylic resins, and others.

In some embodiments, the polymeric object is of a material selected from thermoplastic polymers, such as polyolefins, polar thermoplastics, polystyrene, polyvinyl chloride (PVC), acrylonitrile-butadiene-styrene (ABS), styrene copolymers, polyacrylonitrile, polyacrylates, polyacrylamides, polypropylene, vinyl acetate polymers, vinyl alcohol polymers, cellulose plastics, thermoplastic elastomers, thermoplastic polyurethanes, polyester-based thermoplastic elastomers, thermoplastic polyesters, polyethylene terephthalate, polybutylene terephthalate, compatibilized thermoplastic blends, polyacetal, polyethers, polyarylates, polycarbonates, polyamides, polyimides, polybenzimidazoles, aromatic polyhydrazides and polyoxadiazoles, polyphenyl quinoxalines, polyphenylene sulfide, polyphenylene vinylene, conducting thermoplastics, conducting thermoplastics composites, poly(aryl ether sulfone)s, poly(aryl ether ketone)s, poly(aryl ether ketones-co-sulfones), poly (aryl ether ketone amide)s, polytetrafluoroethylene and mixtures thereof.

In some embodiments, the polymeric object is of a material selected from poly vinyl alcohol (PVA), polyactic acid (PLA), acrylonitrile butadiene styrene (ABS) and polyetherimide (PEI) and other ULTEM polymers and polyether ether ketone (PEEK).

The invention further provides a hybrid structure comprised of a polymeric region associated with at least one wood-containing coating or layer or film. In some embodiments, the hybrid structure is a core-shell structure, wherein the core is polymeric and the shell is a wood composite, as defined herein. In some embodiments, the hybrid structure is a bilayer or a multilayered structure, wherein one of the layers is of a polymeric material and the other wood composite, as defined herein.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Binder Ink Description

The binder is composed of CNC particles dispersed in water. The concentration of CNC can be up to 20 wt % or as low as 0.01 wt %. Once mixed with wood flour or chips, it adheres to the surface of the wood chips and after the water evaporates, the CNC serves as a binder between the wood pieces. The binder can be mixed with the wood flour/chips into a homogenous mixture for deposition methods such as dispenser printing or to be printed directly onto layers of the wood flour/chips to be used in binder jetting/powder printer.

Figure 1:
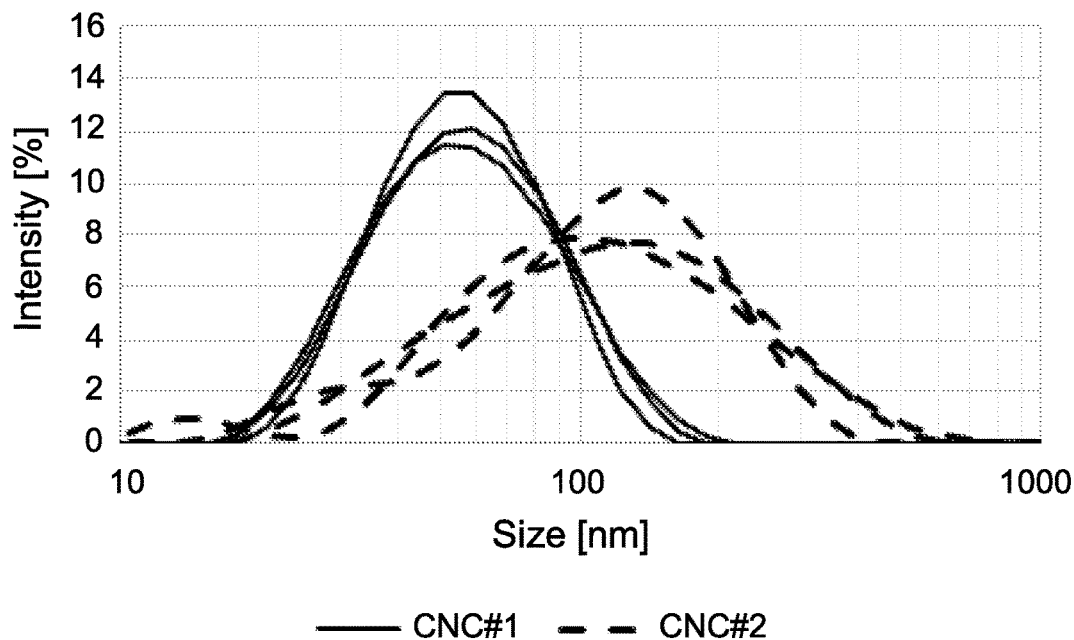
FIG. 1 depicts DLS of two different CNC used in experimenters. DLS size: size of CNC #1 was measured to be 88.37 nm with 0.379 PdI and 48.34 nm with 0.204 PdI for CNC #2.

FIG. 1 shows the viscosity of the binder ink without the wood chips. Xyloglocan (XG) can be used as an additive.

Rheology of the Ink

Low surface charge density CNC suspension ((DLS size: 88.37 nm (0.379 PdI), FIG. 1.) prepared from sulfuric acid hydrolysis of kraft pulp sheets (TEMBEC), were mixed with Xyloglucan (XG) from tamarind seed (Megazyme) according to the compositions presented in Table 1.

TABLE 1

| | \multicolumn{6}{c}{Name by ratio XG:CNC} |
|---|---|---|---|---|---|---|
| Material | 0:1 | 1:100 | 1:50 | 1:10 | 1:4 | 1:0 |
| CNC wt. % | 3 | 2.97 | 2.94 | 2.72 | 2.4 | 0 |
| XG wt. % | 0 | 0.0297 | 0.0588 | 0.272 | 0.6 | 3 |

Figure 2:
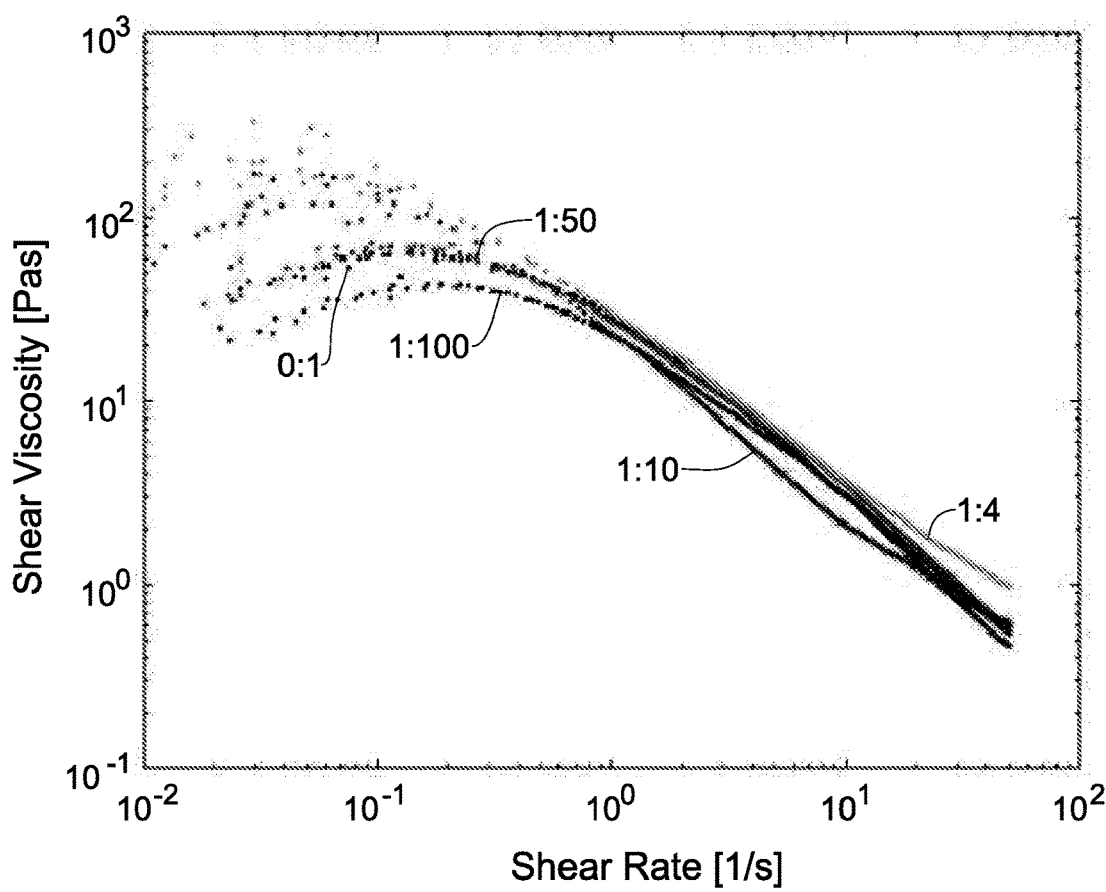
FIG. 2 presents viscosity as a function of shear rate, shear thinning property can be seen in all inks ratio of XG:CNC.

Controlled rate mode rheology measurements of compositions with different XG:CNC ratios were performed at room temperature (Haake Rheostress 6000 coupled with RS6000 temperature controller, lower plate—TMP60, higher plate P60 TiL, Thermo Fisher Scientific Inc.). Four independent 1 mL samples were prepared and evaluated; one representative curve is presented in FIG. 2.

Shear thinning behavior can be seen for all samples. As more XG been added initial viscosity raises up while slope remains the same. This important behavior of the ink is crucial for direct ink writing 3D printing technique.

Mechanical Properties of Molds
Mold—Compression Test,
Compression Test of Plain CNC Based Ink High surface charge density CNC suspension (DLS size: 48.34 nm (0.204 PdI), FIG. 1), with surface charge density of 0.6 e/nm$^2$), prepared from sulfuric acid hydrolysis of kraft pulp sheets (TEMBEC), mixed with two types of flour wood (made from Cupressus and *Eucalyptus*) (Table 2).

TABLE 2

| Ink name | DW [g] | 2.4% CNC [g] | Flour wood [g] |
|---|---|---|---|
| 0% CNC | 4 | 0 | 2 |
| 0.5% CNC | 3.167 | 0.833 | 2 |
| 1.5% CNC | 1.5 | 2.5 | 2 |
| 2.4% CNC | 0 | 4 | 2 |

Figure 3:
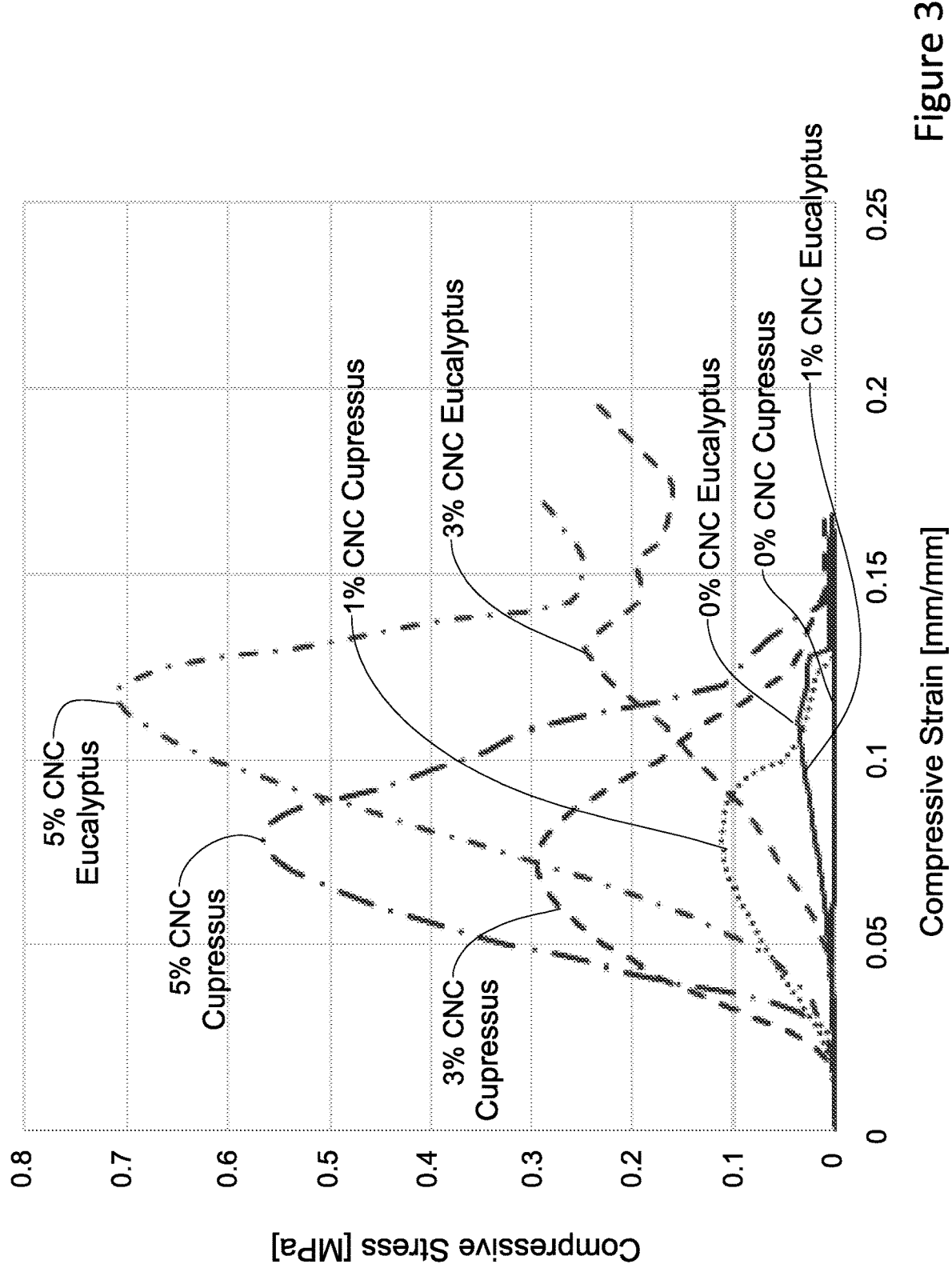
FIG. 3 presents the results of mold compression test of CNC ink with two different flour wood.
Figure 4A:
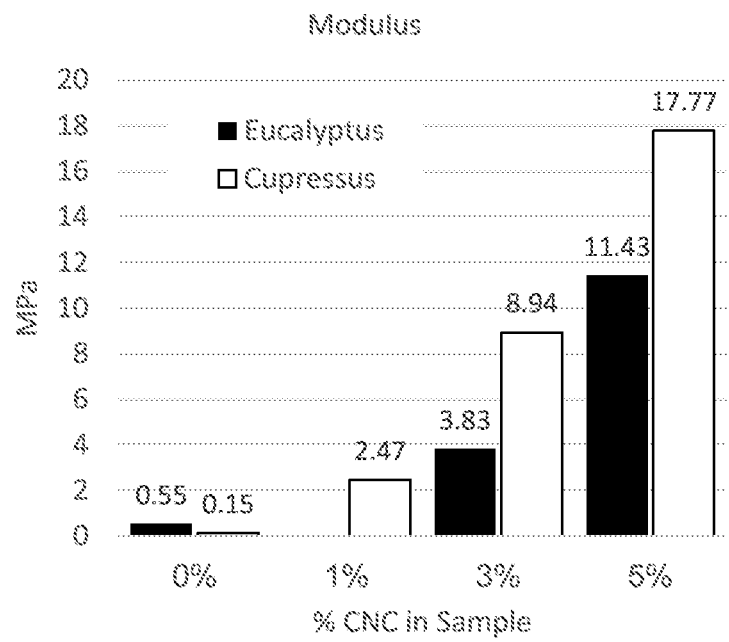
FIGS. 4A-B depict (A) increase modulus as the addition of CNC (B) increasing in maximum compressive load as CNC concentration goes up.
Figure 4B:
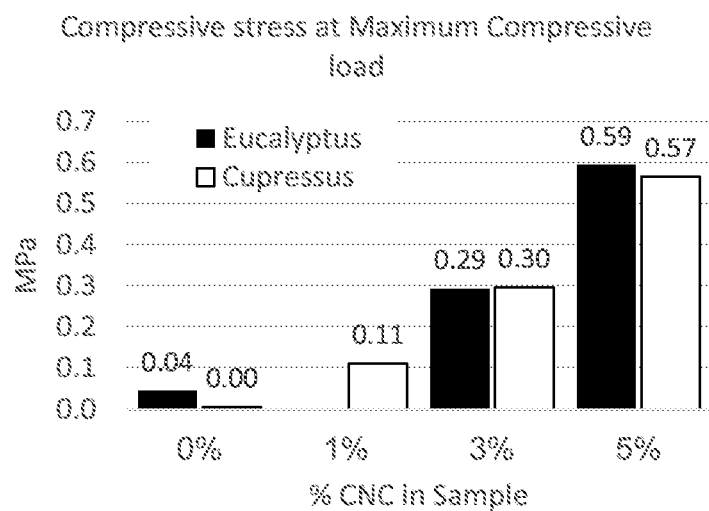

1.5 g of different ratios of CNC samples were dried in a cylinder mold (D=10 mm, H=20 mm), for at least 48 Hr at 60° C. The samples were evaluated by a compression test by Instron Universal Testing Machine (Model 3345, Instron Corp. equipped with a 100N load cell) with a speed rate of 2 mm/min until the samples broke (FIG. 3). It was found that the mechanical properties increased dramatically with the addition of CNC. Young's modulus has improved by an order of magnitude from below 1 MPa for samples without CNC (0% CNC), to 11-17 MPa for 5 wt. % CNC, depending on the origin of the wood, while maximum stress load has improved with the same trend (FIG. 4). It should be noted that while using small particle size wood flour (75 um) the modules of the printed samples increased from 1.5 to >20 MPa.

Mold—Compression Test of XG and CNC Based Ink

Low surface charge density CNC suspension ((DLS size: 88.37 nm (0.379 PdI)), prepared from sulfuric acid hydrolysis of kraft pulp sheets (TEMBEC), were mixed with Xyloglucan (XG) from tamarind seed (Megazyme) according to the compositions presented in Table 3. For ink preparation, 4 g of samples with different XG:CNC were mixed with 4 g of DW and 2 g of wood flour (*Eucalyptus*).

TABLE 3

| | \multicolumn{6}{c}{Name by ratio XG:CNC} |
|---|---|---|---|---|---|---|
| Material | 0:1 | 1:100 | 1:50 | 1:10 | 1:4 | 1:0 |
| CNC wt. % | 3 | 2.97 | 2.94 | 2.72 | 2.4 | 0 |
| XG wt. % | 0 | 0.0297 | 0.0588 | 0.272 | 0.6 | 3 |

Figure 5A:
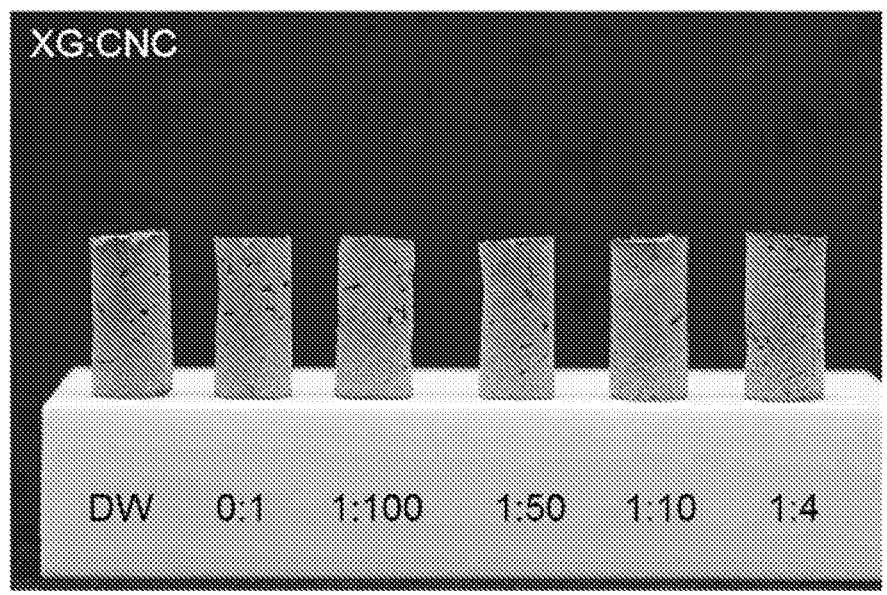
FIGS. 5A-B present (A) mold samples of wood with different ratio of XG:CNC for compression test (B) stress-strain curve of the measured objects.
Figure 5B:
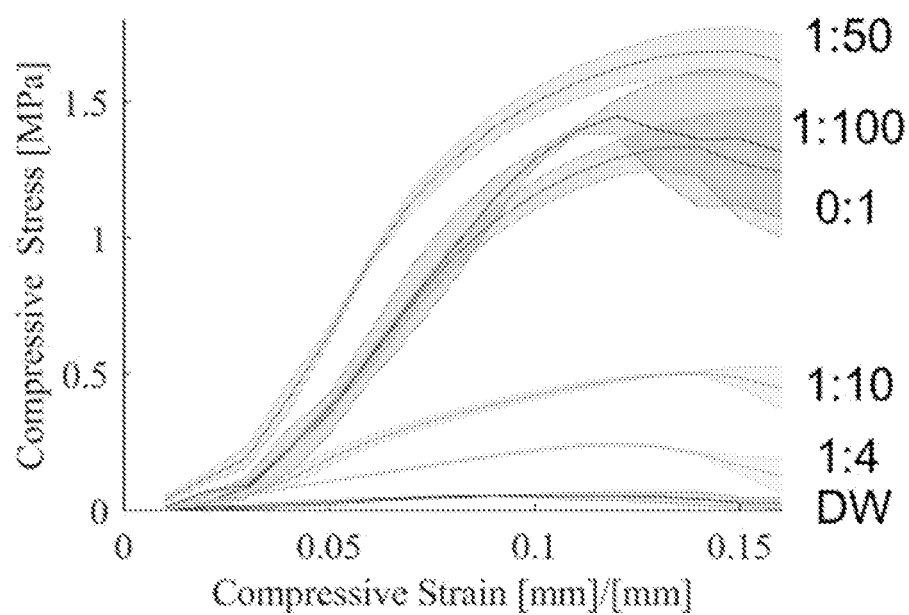

1.5 g of ink samples were dried in a cylinder mold (D=10 mm, H=20 mm), for at least 48 Hr at 60° C. The samples were compression tested by Instron universal testing machine (Model 3345, Instron Corp. equipped with a 100N load cell) with a speed rate of 2 mm/min until samples broke (FIG. 5).

As seen, the mechanical properties were improved as more XG was added until a threshold of 1:50 XG:CNC.

Mold—Three Point Bending 2.5 g of industrial hardwood wood flour FIBER-75, LA.SO.LE) was mixed with 10 g of different weight concentration of CNC (Table 4) using a planetary centrifugal mixer for 5 min (Thinky). 5 g of sample was placed in a rectangle mold (D=20 mm, L=100 mm) and left to completely dry for at least 48 Hr in room temperature. The samples were evaluated by three point bending method by Instron Universal Testing Machine (Model 3345, Instron Corp. equipped with a 5 kN load cell) with a speed rate of 2 mm/min and support span of 30 mm

TABLE 4

| Ink name | suspension [g] | Wood flour [g] |
|---|---|---|
| TDW | 10 | 2.5 |
| 0.5% CNC | 10 | 2.5 |
| 1% CNC | 10 | 2.5 |
| 3% CNC | 10 | 2.5 |

Figure 6:
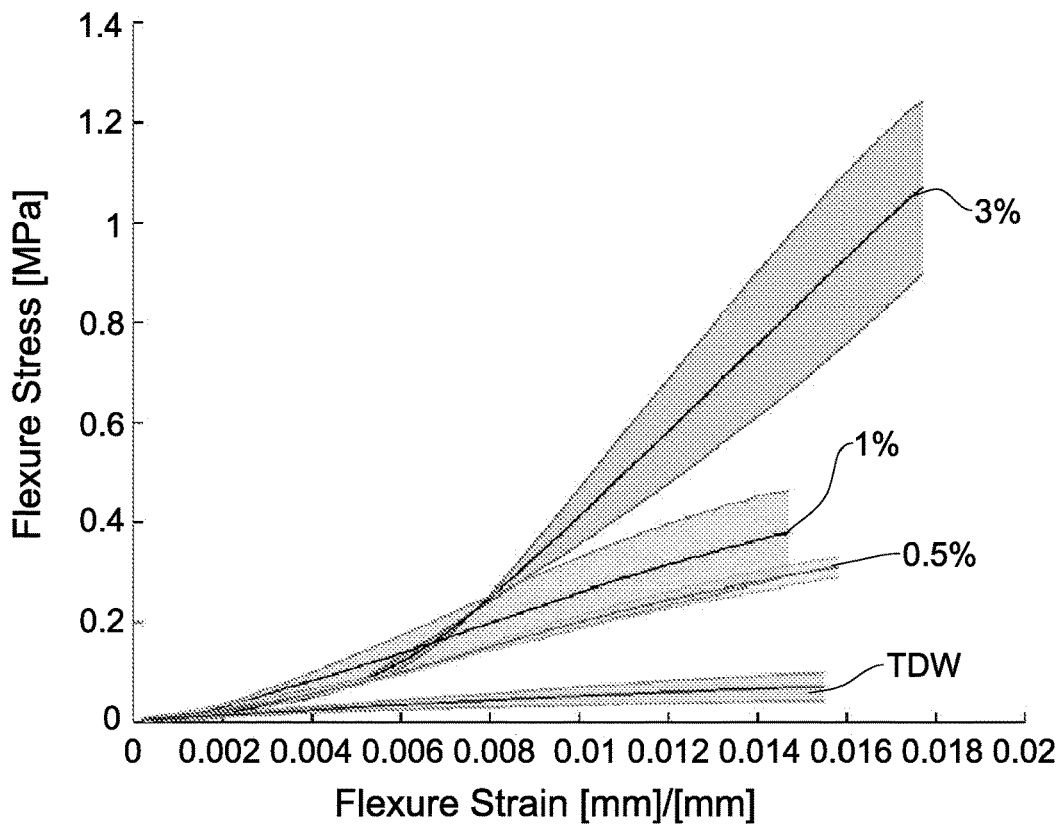
FIG. 6 presents the stress-strain curve of three point bending test of rectangular measured objects as a function of CNC concentration.
Figure 7A:
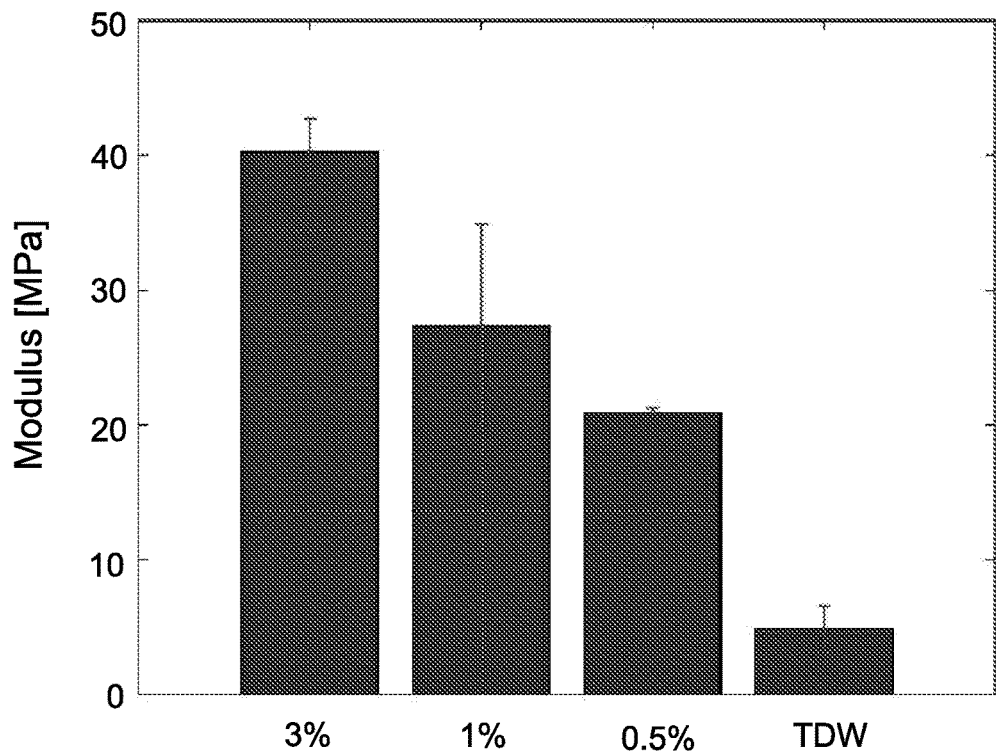
FIGS. 7A-B present a three point bending test of wood flour as a depending of CNC concentration (A) Modulus (B) Stress at break
Figure 7B:
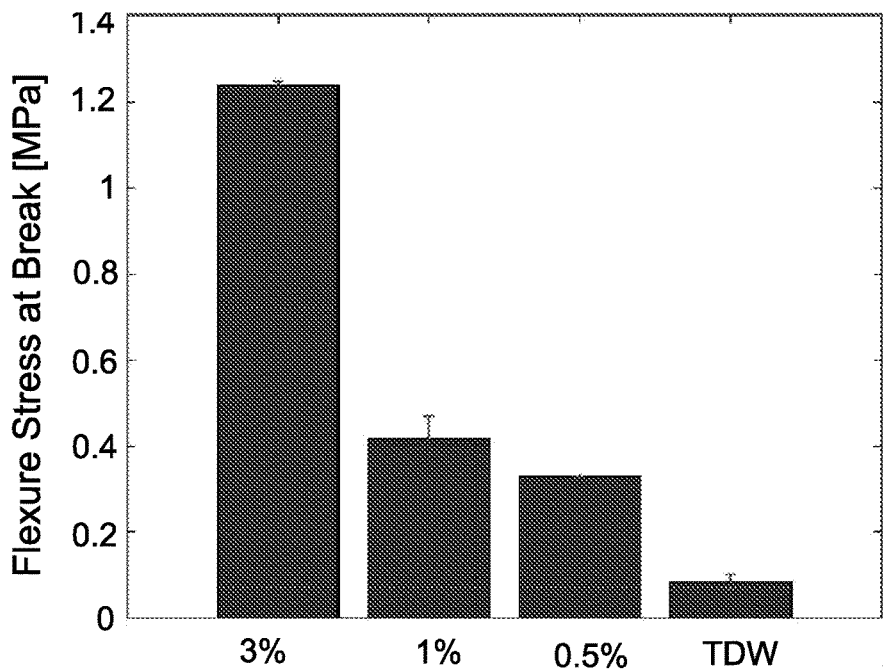

It was found that all mechanical properties improved dramatically with the addition of CNC by at least an order of magnitude (FIG. 6). For example, flexure stress at break had improved from 0.1 MPa for TDW sample to overt 1.2 MPa for 3% CNC sample (FIG. 7).

Printed Samples
Direct Write Printing

The ability to 3D print with dispenser based techniques depends on tailoring the properties of the ink. Pseudo-plastic liquid property is essential to the deposition of the ink, as it liquefies while the ink extrudes out of the nozzle and maintains its shape after deposition. The flow rate printing parameters should be tailored as well for the specific inks. First, the rheological properties of the ink and the obtained mechanical properties of the dry ink were studied by using molds. As optimal parameters were found, 3D printing of 100% wood structures was performed. CNC suspensions exhibit shear thinning behavior due to particle loading and size, and these parameters can be used to control the rheology. Since the inks can be used with high viscosity, the addition of XG and its effect on viscosity and mechanical properties of the resulting molded objects was also investigated.

The dependence of mechanical properties, compression test and rheology, on the ratio of XG:CNC were considered. Once optimal ink parameters such as viscosity and mechanical properties were obtained, the inks were 3D printed and the printed objects characterized.

Figure 8:
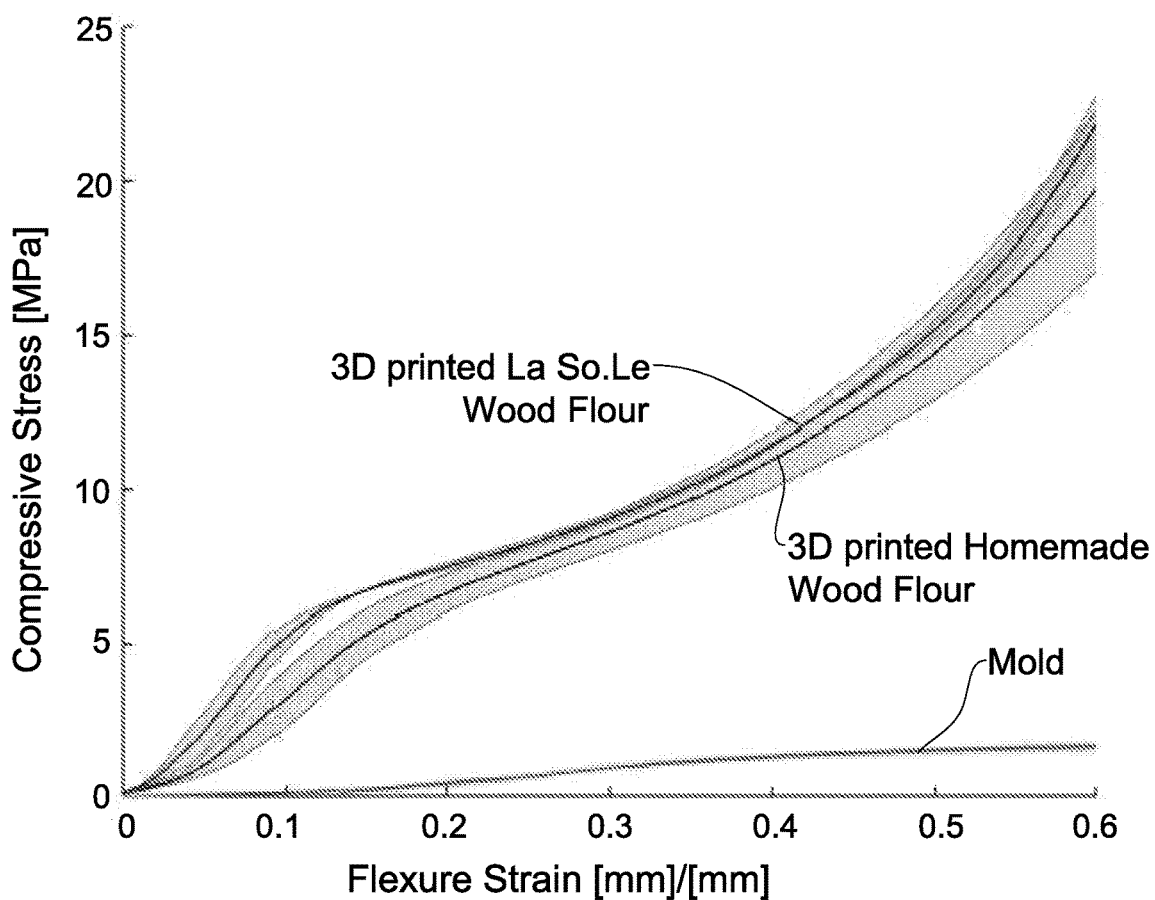
FIG. 8 presents a stress-strain curve of 3D printed cylinder as compare to mechanical properties of XG:CNC:Wood ratio of mold sample.
Figure 9A:
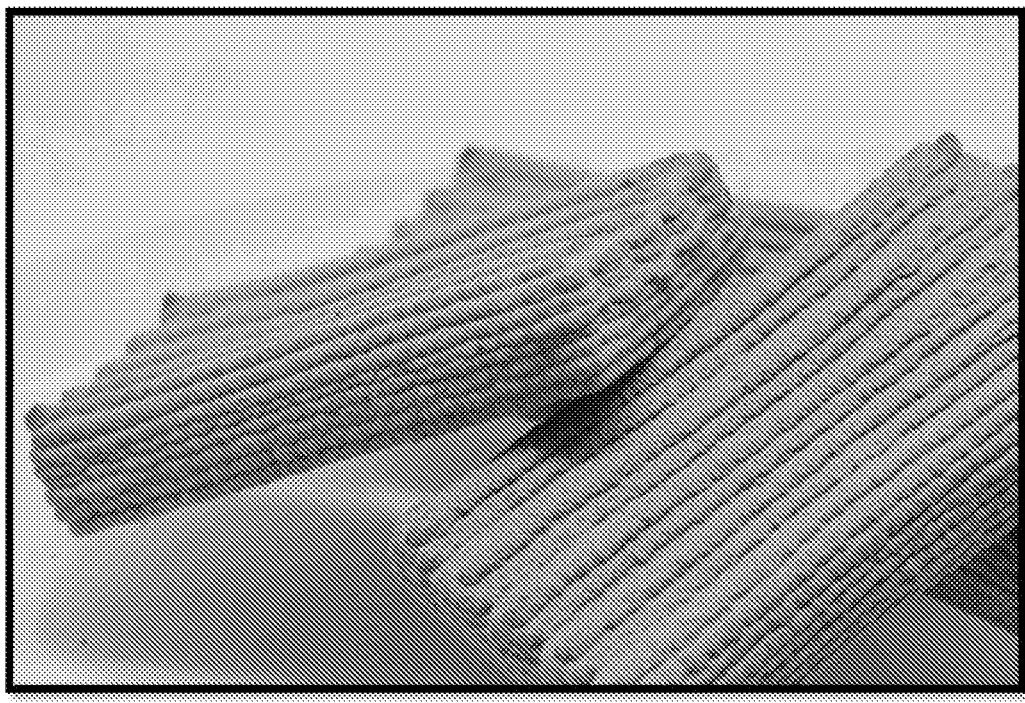
FIGS. 9A-D present various examples of 3D printed 100% wood objects by direct ink printing technology. Shown tree trunk, cube, and printed multi wood flour (maple and hard wood).
Figure 9B:
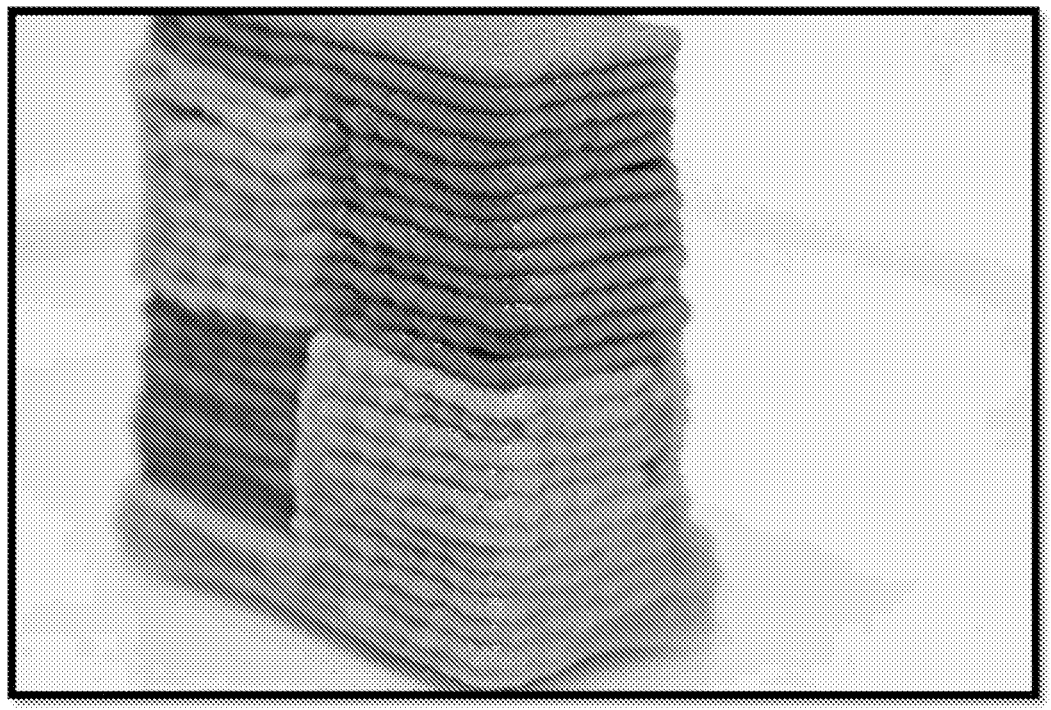
Figure 9C:
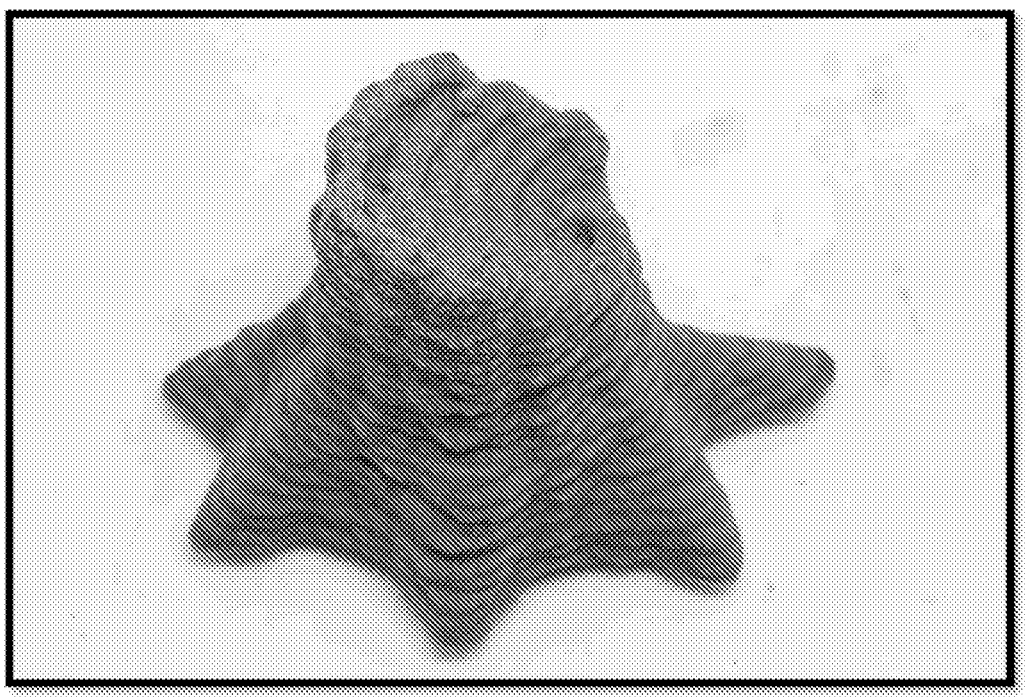
Figure 9D:
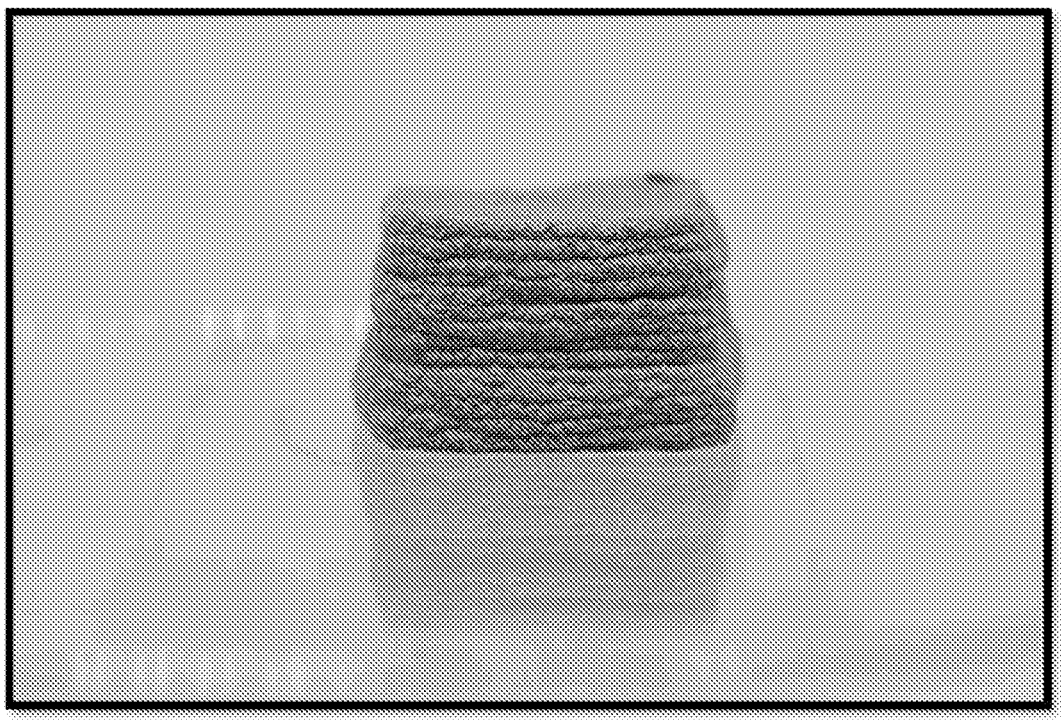
Figure 10A:
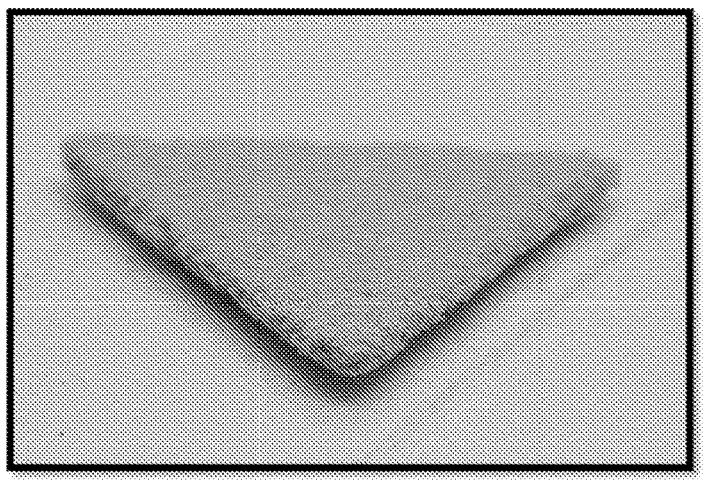
FIGS. 10A-D show 3D printed 100% wood objects by binder-jet powder printing technology (T10 Come True Taiwan, each layer was printed with 1 pass of liquid) A—triangle (0.2% CNC), B—cookie shape (0.1% cnc). C cylinder (0.2% CNC) and D—Japanese carpentry (0.2% CNC).
Figure 10B:
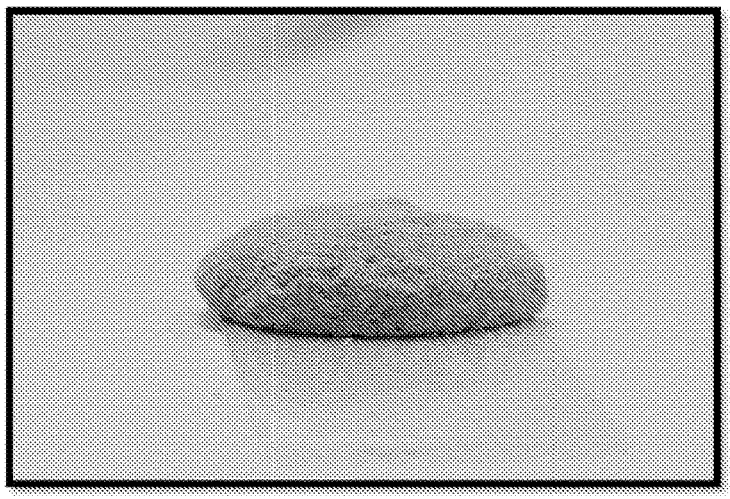
Figure 10C:
Figure 10D:
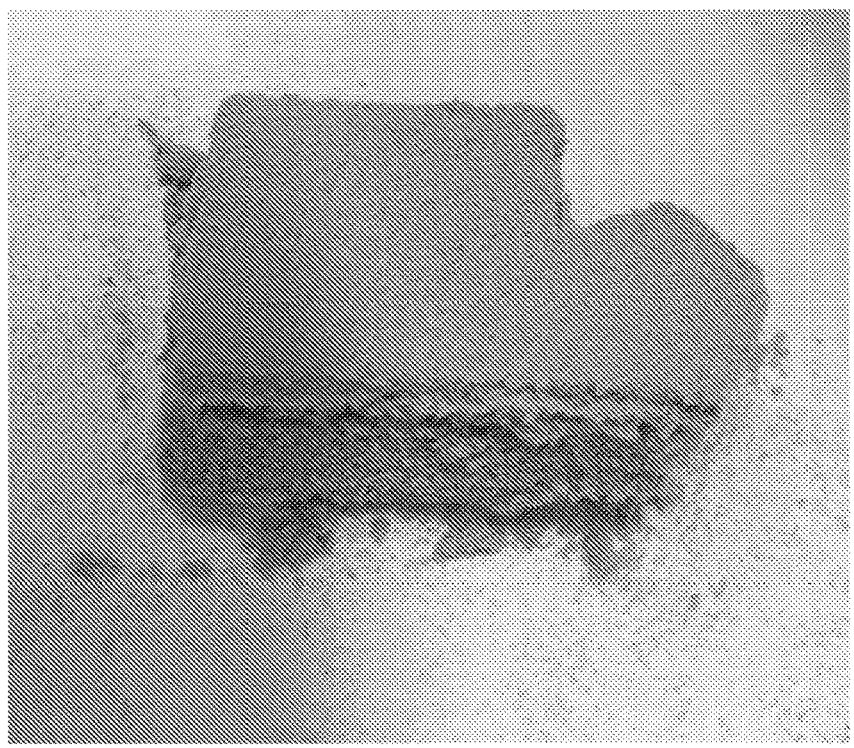

Compression Test of 3D Printed Samples 3D printed cylinders were printed using HYREL3D printer mounted with a 10 ml syringe. Two different wood flour were used, homemade grinded *Eucalyptus* and industrial hardwood wood flour (FIBER-75, LA.SO.LE), with dry weight ratio of 1:0.74:0.06 for Wood-flour:CNC:XG. The samples were compression tested by Instron universal testing machine (Model 3345, Instron Corp. equipped with a 5 kN load cell) with a speed rate of 2 mm/min, measurement stopped by load cell limitation, none of the samples broke (FIG. 8). It was found that the mechanical properties of the 3D printed structures were improved by 400% as compared to objects prepared in molds which is an advantage of 3D printing process compared to conventional extrusion and mold fabrication processes.

Example of 3D Printed Wood Objects 3D printed wood objects can be seen in FIG. 9, showing for the first time fully 3D printed 100% wood without addition of synthetic polymeric binders, by using the direct write technology.

Binder Jetting/Powder Printing Ink Characterization and Results

The ability to 3D print with inkjet based technology requires tailoring the properties of the ink. The typical surface tension and viscosity should be about 15 cP and 30 mN/m respectively (these parameters may vary, depending on the type of printer and print head). Therefore, low concentration of CNC should be used in order to meet typical DOD inkjet print head. The printing parameters of and the printer such as frequency should be tailored as well for the specific inks. The rheological properties of the ink and the obtained mechanical properties of the dry ink were first studied by using molds. Upon finding the optimal parameters, 3D printing experiments of 100% wood structures were performed.

Example of 3D Printed Wood Objects

As can be seen in FIG. 10, various structures can be printed while using binder jetting of the CNC based binder onto hard wood flour. In this approach more complex structures can be obtained due to the unbound wood flour that serves as support material for complex structures. The various structures can be immersed in another natural liquid binder solution for final hardening.

Figure 11:
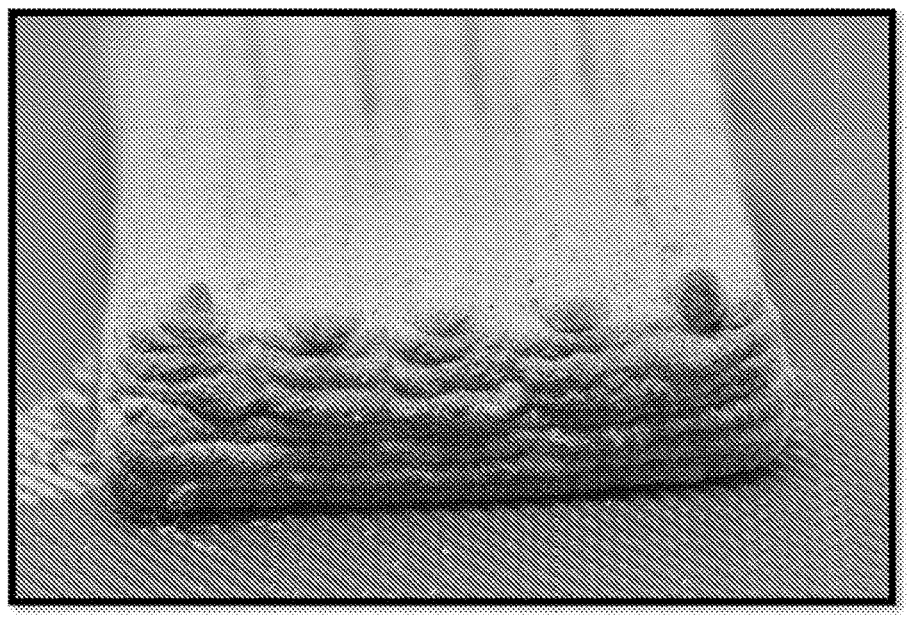
FIG. 11 presents a 3D printed 100% wood objects printed on 3D printed ABS using extrusion based technique.

ABS plate was coated by 3D printed wood showing coating/covering/packaging ability. The ABS was printed initially by an FDM head followed by extrusion\dispensing of the wood-based ink onto the formed ABS structures. The printing of the hybrid structure can be formed in the same layer, different layer, sequential layer—resulting in a wood texture structure with inner plastic body, as shown in FIG. 11.

The invention claimed is:

1. A paste or plasticine-like mixture comprising water; at least one natural wood material selected from wood flour, wood chop and wood chips; cellulose nanocrystals (CNC); and at least one hemicellulose and/or lignin and/or starch, wherein the at least one natural wood material is free of unnatural or synthetic additives; the composition being for use in
   (a) a process of fabrication of 3D wood objects; or
   (b) a process for coating or covering a surface region of an object with the wood material;
wherein the mixture is free of formaldehyde, synthetic resins and/or epoxy based materials;
wherein the CNC is a crystalline rod-like material with a length of between 100 and 400 nm; and
wherein the amount of CNC is between 0.01 wt % and 20 wt %.

2. The mixture according to claim 1, wherein the process of fabrication comprises casting, molding, extrusion, calendaring, injection, printing, hand-forming or manual processing.

3. The mixture according to claim 1, comprising all naturally derived materials.

4. The mixture according to claim 1, wherein the at least one wood material is a natural wood.

5. The mixture according to claim 4, wherein the natural wood material is derivable from wood stalks, branches, trunk or wood bark.

6. The mixture according to claim 4, wherein the wood material is obtained from a stalk, a branch, trunk or a bark of a tree or a bush selected from basswood, beech, birch, *eucalyptus*, walnut, pecan, cedar, cherry, elm, gum, hickory, lauan, mahogany, maple, oak, pine, poplar, redwood, rosewood, satinwood, sycamore, teak, alder, apple, aspen, chestnut, cottonwood, cypress, fir, hackberry, hemlock, holly, koa, laurel, locust, *magnolia*, pear-wood, spruce, tupelo and willow.

7. The mixture according to claim 6, wherein the tree is *eucalyptus*.

8. The mixture according to claim 1, wherein the at least one wood material is derived from hard or soft wood.

9. The mixture according to claim 1, wherein the at least one hemicellulose is selected from xylan, glucuronoxylan, arabinoxylan, glucomannan, galactoglucomannan and xyloglucan.

10. The mixture according to claim 9, wherein the hemicellulose is xyloglucan.

11. The mixture according to claim 1, the composition comprising at least one wood material, CNC and a hemicellulose or starch or lignin.

12. The mixture according to claim 1, the composition comprising at least one wood material, CNC and xyloglucan.

13. The mixture according to claim 1, wherein the object is a polymeric object formed of a material selected amongst thermoplastic polymers and thermoset polymers.

14. A wood object manufactured from a mixture according to claim 1.

* * * * *